Nov. 1, 1955   A. GALABA   2,722,464
SELF-ALIGNING BEARING
Filed April 30, 1952

INVENTOR.
ALEXANDER GALABA
BY Hudson, Boughton,
Williams, David & Hoffmann
ATTORNEYS

United States Patent Office 2,722,464
Patented Nov. 1, 1955

2,722,464

SELF-ALIGNING BEARING

Alexander Galaba, Euclid, Ohio, assignor to Morrison Products, Inc., Cleveland, Ohio, a corporation of Ohio Application April 30, 1952, Serial No. 285,107

3 Claims. (Cl. 308—26)

This invention relates to self-aligning bearings of the type having an inner bearing member mounted in a hollow metal holder or housing with a yieldable rubber body or annulus interposed therebetween.

An object of the invention is to provide a self-aligning bearing of the type referred to in which the inner bearing member and rubber annulus form an assembly unit which is normally seated in the holder but is removable from the holder through an end opening thereof when the assembly unit becomes worn and is to be replaced.

Another object is to provide a bearing structure of the character mentioned in which the holder is located in an opening of a supporting member and is formed by connected arcuate portions of a plurality of spider arms.

A further object is to provide a self-aligning bearing of the kind indicated above in which the inner bearing member comprises connected sheet metal cup elements.

The invention can be further briefly summarized as consisting in certain novel combinations and arrangements of parts hereinafter described and particularly set out in the claims hereof.

Figure 1:
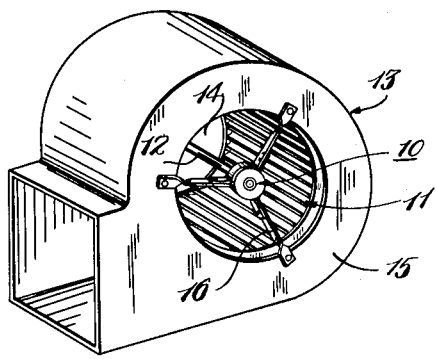
Fig. 1 is a perspective view showing a blower wheel mounting employing the novel self-aligning bearing structure of the present invention.

Before proceeding with the detailed description of the novel self-aligning bearing 10, it should be explained that this bearing can be used for various purposes, but is especially suitable for rotatably mounting a centrifugal blower wheel 11 and its drive shaft 12 in a blower housing 13, as shown in Fig. 1.

The blower wheel 11 can be of the kind disclosed in earlier Patent 2,291,480 granted July 28, 1942, and is located in the blower housing 13 adjacent an air intake opening 14 of the side wall 15. The blower wheel 11 is carried by the drive shaft 12 which in turn is rotatably mounted in a pair of the self-aligning bearings 10, one of which bearings is shown in Fig. 1 as being located substantially centrally of the opening 14 and supported by a plurality of spider arms 16 which have their outer ends bolted or otherwise suitably connected to the blower housing wall 15.

Figures 2, 3:
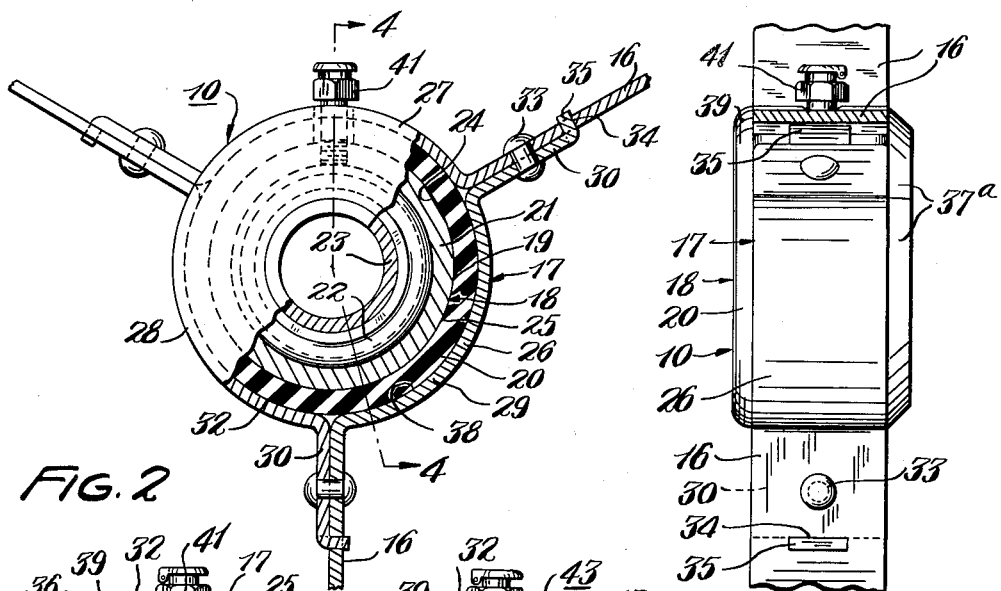
Fig. 2 is mainly an end elevational view of the novel self-aligning bearing, but showing the same with portions thereof broken away.
Fig. 3 is a side elevation of the self-aligning bearing.
Figures 4, 5:
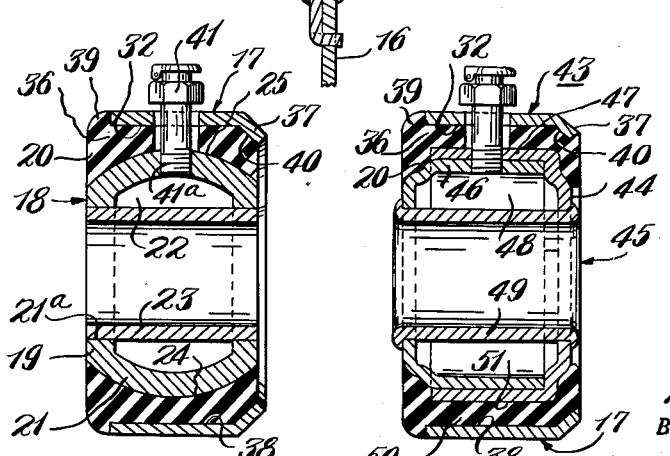
Fig. 4 is a longitudinal vertical section taken through the self-aligning bearing substantially on section line 4—4 of Fig. 2.
Fig. 5 is a longitudinal vertical section similar to Fig. 4, but showing a modified form of this self-aligning bearing.

In the form of the invention shown in Figs. 2, 3 and 4, the self-aligning bearing 10 comprises in general a hollow holder or housing 17 and a bearing assembly unit 18 seated therein. The assembly unit 18 comprises an inner bearing member 19 and a rubber cushioning member in the form of an annulus 20 disposed around such inner bearing member.

The inner bearing member 19 comprises, in this instance, a cast metal body 21 having a lubricant chamber 22 therein and a bearing sleeve or bushing 23 mounted in the cast metal body and extending across the lubricant chamber. The body 21 is here shown as having a transversely convex external annular surface 24 of a substantially spherical shape. The bearing sleeve 23 may be of the form which is porous or has small openings therein for admitting lubricant thereinto from the chamber 22 and is mounted in the body 21 by having a press fit in the aligned openings 21ᵃ of the latter.

The annulus 20 is a resilient or yieldable rubber cushioning member having a transversely concave internal annular groove 25 therein in which the transversely convex external annular periphery 24 of the bearing member 19 engages. The engagement of the external periphery 24 in the internal groove 25 retains the bearing member 19 and the rubber annulus 20 in a connected relation to constitute the above-mentioned bearing assembly unit 18. The rubber annulus 20 can also be connected with the bearing member 19 by being molded in place around and bonded to the cast metal body 21.

The holder or housing 17 represents an important part of the self-aligning bearing 10 and is here shown as being a sheet metal structure comprising a plurality of connected complemental sections, in this instance three such sections 26, 27 and 28. Each of these connected sections comprises an arcuate segment or strap portion 29 having outturned substantially radially extending short and long end portions, of which the short end portions comprise the lugs 30 and the long end portions constitute the above-mentioned spider arms 16. The complemental sections 26, 27 and 28 are disposed with the arcuate segments 29 thereof in a substantially circumferentially aligned relation, as shown in Fig. 2, such that the inner surfaces of these segments define an internal annular seat 32 in the hollow holder 17.

The lug 30 of each section of the holder 17 is in a face-to-face engagement with the adjacent arm 16 of the next section and is secured thereto as by means of the rivet 33. Instead of the rivets 33, the lugs 30 could be secured to the arms 16 by means of clamping bolts extending therethrough. The lugs 30 and the arms 16 are preferably also connected in the desired relation by providing the arms with slots 34 in which angular tongues 35 formed on the ends of the lugs 30 engage, as shown in Fig. 2.

The holder 17 is provided at one end thereof with an end opening 36 which is of substantially the same transverse dimension or diameter as the internal annular seat 32. At its opposite end, the holder 17 is provided with an inwardly extending annular flange 37. The flange 37 is formed by circumferentially aligned angular edge portions 37ᵃ of the connected sections 26, 27 and 28.

The rubber annulus 20 of the assembly unit 18 is provided with an external annular seating surface 38 which is of the same shape and transverse dimension or diameter as the internal annular seat 32 of the holder 17, such that when the bearing unit is assembled in the holder, it will be supported therein by the seating engagement of the external surface 38 with the internal annular seat 32. At its outer end, the rubber annulus 20 is preferably provided with an annular bead or radial flange 39 which overlaps and engages the end face of the holder 17. At its inner end, the annulus 20 is provided with an annular bevel or chamfer 40 which seats against the inwardly extending flange 37 of the holder.

When the bearing assembly unit 18 is fully mounted in the holder 17, as shown in the drawings, the rubber annulus 20 has a snug engagement in the holder and supports the inner bearing member 19 therein in a manner to absorb minor shocks and vibrations and to also accommodate minor misalignment of the blower shaft 12 when the latter is journaled in the bearing sleeve 23. If desired, the connected sections 26, 27 and 28 of the holder 17 can be of such proportions that during the assembling thereof, they will exert a clamping force against the external surface 38 of the rubber annulus 20. Usually, however, the bearing assembly unit 18 is assembled into the holder 17 by pushing the same axially thereinto through the end opening 36.

A lubricant fitting 41 provides communication with the lubricant chamber 22 for supplying lubricant to the latter, and is here shown as extending through aligned radial openings of the holder 17 and the rubber annulus 20 and having an inner end 41ª threadedly engaged in an opening of the metal body 21. The lubricant fitting 41 also assists in maintaining the bearing unit 18 in its assembled relation in the holder 17. The openings of the holder 17 and of the rubber annulus 20 through which the fitting 41 extends, are of a size affording adequate clearance for this fitting to permit the relative rocking of the inner bearing member 19.

From the construction above described for the self-aligning bearing 10, it will be seen that this bearing embodies the important feature that the assembly unit 18 can be readily removed from the holder 17 whenever the bearing sleeve 21 becomes worn or when deterioration of the rubber annulus 20 has occurred. This removal of the assembly unit 18 can be readily accomplished by axial movement thereof out of the holder 17 through the end opening 36 of the latter. The removal of the assembly unit 18 and the replacement thereof by a similar unit in the holder 17 can be facilitated, if desired, by the removal of some or all of the fastening members 33 by which the sections 26, 27 and 28 are secured together. Usually, however, the fastening members 33 need not be removed since the end opening 36 of the holder 17 permits the removal of the worn assembly unit and the insertion of the renewal unit therethrough.

Fig. 5 of the drawings shows a self-aligning bearing 43 which is generally similar to the self-aligning bearing 10 in that it embodies the same segmental sheet metal holder 17 and is intended to be used in the same manner. The modified bearing 43 differs from the self-aligning bearing 10 in that the inner bearing member 44 of the assembly unit 45 comprises a pair of telescopingly assembled sheet metal cup elements 46 and 47. These cup elements are disposed so as to define therebetween a lubricant chamber 48 which supplies lubricant to a porous or perforated bearing sleeve 49.

The bearing sleeve 49 extends through the end walls of the cup elements 46 and 47 and can be retained therein by a press fit or may have the ends thereof peened so as to assist in holding the cup elements 46 and 47 in their assembled relation. These cup elements can also be held in their connected relation by having their telescopingly engaged portions welded together.

The rubber annulus 50 of the bearing assembly unit 45 extends around the inner bearing member 44 and has seating engagement with the internal annular seating surface 32 of the holder 17 in the same relation as has already been described above for the self-aligning bearing 10. The rubber annulus 50 also has an internal annular groove or channel 51 therein in which the transversely convex external periphery of the inner bearing member 44 engages. The rubber annulus 50 can, if desired, be molded in place around and bonded to the inner bearing member 44.

From the foregoing detailed description and the accompanying drawings, it will now be readily understood that this invention provides a novel form of self-aligning bearing which can be used for various purposes, but which is especially suitable for mounting a centrifugal blower wheel in a blower housing. It will also be seen that this novel self-aligning bearing embodies a construction in which the inner bearing member and the cushioning rubber annulus constitute a bearing assembly which is readily removable as a unit through an end opening of the housing or holder. Additionally, it will be seen that this invention utilizes connected arcuate segments carried by the ends of the arms of a mounting spider to form the hollow holder in which the bearing assembly unit is mounted.

Although the self-aligning bearing of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. A self-aligning bearing comprising; an inner bearing member having a lubricant chamber internally thereof and also having a generally circular transversely convex external periphery; a bearing sleeve extending through said bearing member axially thereof and adapted to be supplied with lubricant from said chamber; a one-piece cushion member made of yieldable rubber and being in the form of an annulus surrounding said bearing member and having an internal annular groove therein in which said transversely convex external periphery of said bearing member engages; said cushion member having an external periphery of substantially cylindrical shape; said bearing member, said bearing sleeve and said cushion member constituting a preformed bearing assembly unit; an outer supporting housing comprising an annular group of preformed complemental sheet metal sections each having an arcuate strap portion and substantially radially outwardly projecting arms at the ends of said strap portion; and connecting means connecting the arms of the adjacent ends of said strap portions in substantially face-to-face engagement; the strap portions of said sections being generally flat transversely thereof such that the inner periphery of said housing defines an axial pocket of substantially cylindrical shape and having a full-width opening leading thereinto at at least one end thereof through which said assembly unit is axially movable into said pocket; said strap portions having arcuately extending angularly inwardly deflected edge flanges thereon and disposed in a circumferential series defining an axially facing internal annular shoulder on said housing at the opposite end of said pocket; said assembly unit having an assembled position in said housing in which the cylindrical periphery of said cushion member has a substantially annularly continuous seating engagement in the cylindrical pocket of said housing and in which the inner end of said cushion member abuts against said internal annular shoulder.

2. A self-aligning bearing as defined in claim 1 in which the strap portions of the housing sections apply a substantially radially inwardly acting clamping force against the cushion member of said assembly unit.

3. A self-aligning bearing as defined in claim 1 in which said inner bearing member comprises a pair of coaxially disposed and telescopingly connected sheet metal cup elements having axially outwardly presented transverse bottom walls provided with substantially axially aligned openings through which said bearing sleeve extends.

References Cited in the file of this patent

UNITED STATES PATENTS

| | | |
|---|---|---|
| 2,189,117 | Prentice | Feb. 6, 1940 |
| 2,270,392 | Talmage et al. | Jan. 20, 1942 |
| 2,474,151 | Levy | June 21, 1949 |
| 2,572,411 | Watt | Oct. 23, 1951 |
| 2,580,119 | Meyers | Dec. 25, 1951 |
| 2,591,222 | Whiteley | Apr. 1, 1952 |